April 2, 1940.  A. F. BREITENSTEIN  2,195,837
SELF-OPENING DIE HEAD
Filed Oct. 31, 1939  2 Sheets-Sheet 1
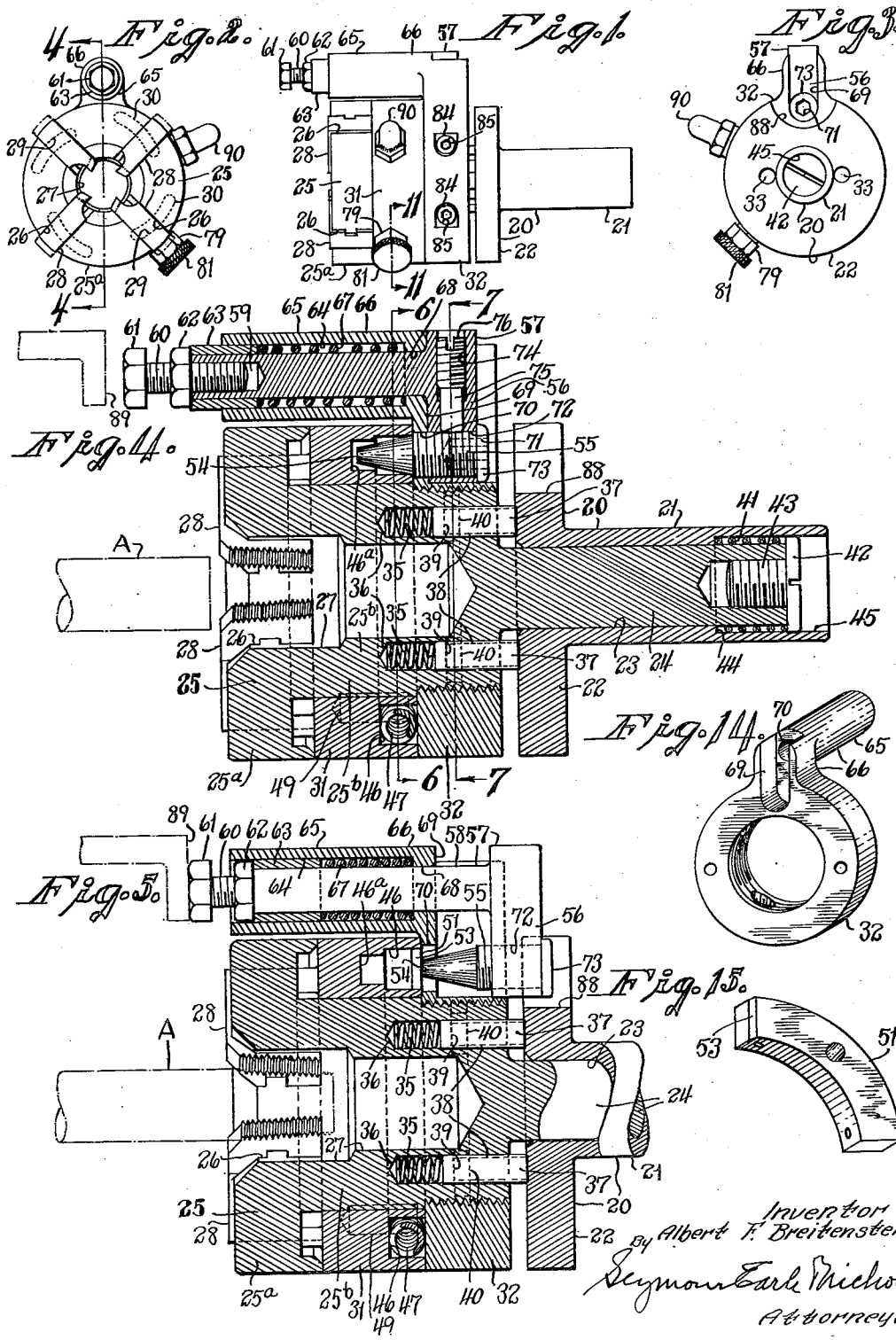
Inventor
Albert F. Breitenstein
By Seymour Earle Nichol
Attorneys

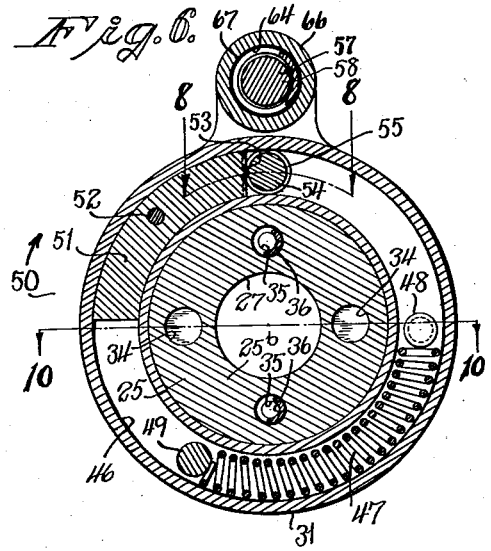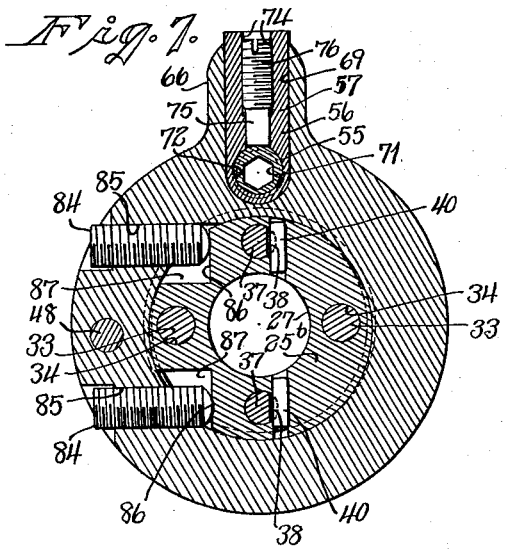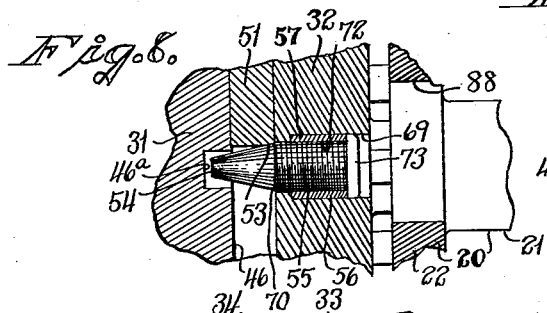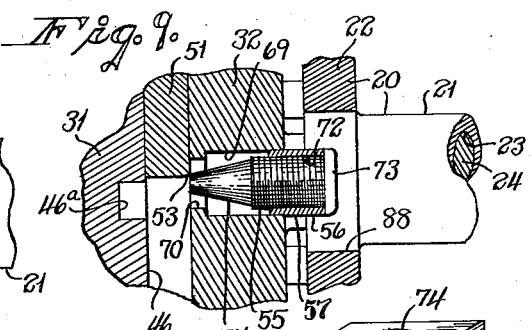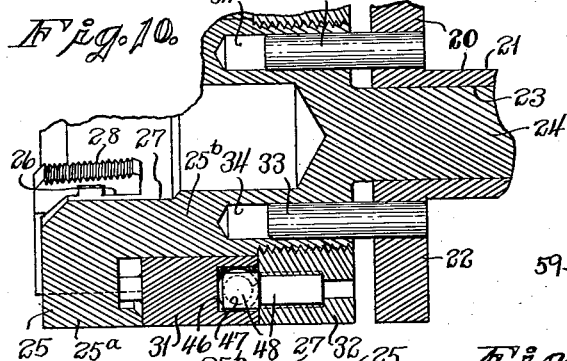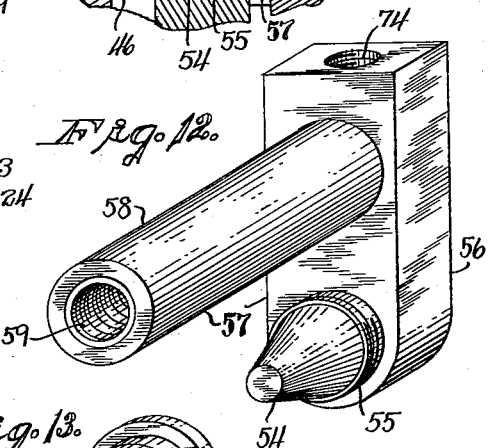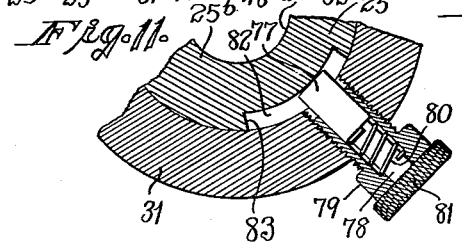

Patented Apr. 2, 1940

2,195,837

UNITED STATES PATENT OFFICE 2,195,837

SELF-OPENING DIE HEAD

Albert F. Breitenstein, New Haven, Conn., assignor to The Geometric Tool Company, New Haven, Conn., a corporation of Connecticut Application October 31, 1939, Serial No. 302,068

7 Claims. (Cl. 10—95)

The present invention relates to improvements in self-opening die heads and more particularly the present invention relates to improvements in self-opening die heads suitable for the formation of taper threads and of the type employing an oscillating chaser-operating member.

In some respects the present invention constitutes an improvement upon the structure disclosed in my co-pending application Ser. No. 277,148, filed June 3, 1939.

One of the objects of the present invention is to provide a superior self-opening taper-thread-cutting die head of the character above referred to and which is reliable in its operation and economical to produce and maintain.

Another object of the present invention is to provide a superior self-opening taper-thread-cutting die head of the type above referred to and characterized by such a degree of compactness as will enable the die head to be used in confined and limited spaces.

A further object of the present invention is to provide a superior die head of the type referred to and which may be relied upon to accurately and uniformly retire its chasers from the work at a predetermined rate for the formation of tapered threads during repeated cycles of operation of the die head.

A still further object of the present invention is to provide a taper-thread-cutting die head having superior taper-control means incorporated therein for progressively retiring the chasers at a predetermined rate for the formation of taper threads, the said means being readily interchangeable with other taper-control means for cutting of threads having a different taper.

Still another object is to provide a superior self-opening die head which may be used for cutting either tapered or straight threads.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the present invention are shown for illustrative purposes:

Fig. 1 is a view in side elevation of a self-opening taper-thread-cutting die head employing the present invention;

Fig. 2 is a front-face view thereof;

Fig. 3 is a rear-face view thereof;

Fig. 4 is a view in vertical central-longitudinal section taken on the line 4—4 of Fig. 2 but on a larger scale and illustrating the parts in the positions they assume when the chasers are in their fully advanced or thread-cutting position;

Fig. 5 is a similar view but illustrating the parts in the positions they assume at the instant the latch-member reaches a position to permit the chasers to be retired out of engagement with the work;

Fig. 6 is a transverse sectional view taken on the line 6—6 of Fig. 4;

Fig. 7 is a similar sectional view taken on the line 7—7 of Fig. 4;

Fig. 8 is a fragmentary sectional view taken on the line 8—8 of Fig. 6;

Fig. 9 is a view corresponding to Fig. 8 but showing the latching-stud retired sufficiently to permit the chasers to be retired out of engagement with the work;

Fig. 10 is a fragmentary sectional view taken on the line 10—10 of Fig. 6;

Fig. 11 is a similar view taken on the line 11—11 of Fig. 1;

Fig. 12 is a perspective view of the latch-member;

Fig. 13 is a similar view of the latching-stud;

Fig. 14 is a perspective view of the latch-carrying member looking mainly at the rear face thereof; and Fig. 15 is a perspective view of the segmental latch-block.

The particular self-opening taper-thread-cutting die head herein chosen for illustration of the present invention includes a mounting-member generally designated by the reference character 20 and including a rearwardly-extending tubular shank 21 which is adapted to be rigidly mounted in any suitable machine. The said tubular shank 21 is preferably formed integral with and projects rearwardly from a plate-like flange 22 and is formed with an axial bearing-passage 23 adapted to receive, with a close sliding fit, a shank 24 extending rearwardly from and formed integral with a chaser-carrying member generally designated by the reference character 25.

The chaser-carrying member 25 is formed at its forward end with a flange-like head 25a and with four (more or less) corresponding radial grooves 26 which intersect the outer periphery of the said head 25a and an axially-arranged cavity 27 formed in the said chaser-carrying member. Each of the radial-grooves 26 also intersects the rear face of the head 25a as well as the entire forward face of the chaser-carrying member 25. Installed in each of the radial grooves 26 is one of four radially-movable chasers 28 each of which is provided in its rear face with a rearwardly-opening and transversely-extending notch 29. The notch 29 in the rear face of each chaser 28 is slightly inclined and receives the adjacent one of four similarly-inclined cam-lugs 30 forwardly projecting from an oscillating chaser-operating ring 31.

The oscillating chaser-operating ring 31, above referred to, is mounted with capacity for oscillating movement upon the cylindrically-contoured body-portion 25b of the chaser-carrying member 25 and is retained in place thereon against relative rearward displacement by a ring-like oscillatable latch-carrying member 32. The said latch-carrying member 32 is threaded upon the rear of the body-portion 25b of the chaser-carrying member 25 and is rotatably shiftable with respect thereto for purposes of adjustment, as will hereinafter appear.

For the purpose of coupling the chaser-carrying member 25 and the mounting-member 20 together against relative turning movement, the flange 22 of the said mounting-member is provided with two (more or less) forwardly-projecting coupling-pins 33—33, as is particularly well shown in Fig. 10. The said coupling-pins 33—33 project forwardly from the flange 22 and extend with a close sliding fit respectively into the adjacent one of two corresponding coupling-sockets 34—34 formed in the body-portion 25b of the chaser-carrying member 25 and opening rearwardly through the rear face thereof adjacent the shank 24 of the said chaser-carrying member 25.

From the foregoing it will be readily seen that the interfitting of the coupling-pins 33 and the coupling-sockets 34 will serve to couple the mounting-member 20 to the chaser-carrying member 25 against relative rotary movement. Relative axial movement, however, is provided for between the mounting-member 20 and the chaser-carrying member 25, for the purpose as will hereinafter appear.

To normally but yieldingly hold the chaser-carrying member 25 and the parts carried thereby in their spaced relationship with respect to the forward face of the flange 22 of the mounting-member 20, and to provide a cushioning action for the initial engagement between the chasers 28 and the work, two helical cushioning-springs 35—35 are provided. The said cushioning-springs 35—35 are respectively housed within rearwardly-opening spring-pockets 36—36 formed in the body-portion 25b of the chaser-carrying member 25 as is clearly shown in Figs. 4 and 5. The said cushioning-springs 35—35 each press against the end wall of its complemental spring-pocket 36 while the rear end of each of the said cushioning-springs respectively thrust rearwardly against one of two cushioning-plungers 37—37. The said cushioning-plungers 37—37 are respectively mounted with capacity for reciprocating movement in one of the spring-pockets 36—36.

Each cushioning-plunger 37—37 above referred to thrusts at its rear end against the forward face of the flange 22 of the mounting-member 20 and is formed with a flat side-face 38 extending from its rear end to a point adjacent its front end. To limit the rearward movement of the cushioning-plungers 37—37, the end-wall 39 of the flat side-face 38 of each cushioning-plunger is engageable with one of two retaining-pins 40—40 mounted substantially radially in that portion of the chaser-carrying member 25 respectively adjacent one of the two spring-pockets 36—36.

The central portion of each retaining-pin 40 projects laterally into the adjacent one of the two spring-pockets 36—36 into position to be engaged by the end-wall 39 of the particular cushioning-plunger 37 in the pocket in question.

To normally but yieldingly hold the cushioning-plungers 37—37 of the chaser-carrying member 25, in contact with the forward face of the mounting-member 20, the rear end of the shank 24 of the chaser-carrying member 25 is encircled by a retracting-spring 41. The said retracting-spring 41 at its outer or rear end thrusts against the adjacent face of the head 42 of a screw 43 threaded into the rear end of the shank 24, as is particularly well shown in Fig. 4. At its inner or front end, the retracting-spring 41 thrusts against a shoulder 44 formed at the junction of the axial bearing-passage 23 proper of the mounting-member 20 and the enlarged outer or rear portion 45 of the said bearing-passage.

The cushioning-springs 35—35, and the retracting-spring 41, are preferably so proportioned in the elastic power which they provide, that the said cushioning-springs 35—35 dominate the retracting-spring 41, whereby, in the absence of extraneous forces, the cushioning-plungers 37—37 will always hold the rear face of the retaining-member 32 in spaced relationship forwardly of the front face of the flange 22 of the mounting-member 20, despite the continued effort of the retracting-spring 41 to bring the two said faces together.

Returning to the chaser-operating ring 31, it will be observed that in its rear portion the said chaser-operating ring is formed with a rearwardly-opening annular groove 46 in which is mounted a helical chaser-retracting spring 47, as is especially well shown in Fig. 6. The said chaser-retracting spring thrusts at one end against a stud 48 which is rigidly mounted in the latch-carrying member 32 and which projects forwardly therefrom into the annular groove 46 in the rear face of the chaser-operating ring 31, as is particularly well shown in Figs. 6 and 10 of the drawings. The opposite end of the chaser-retracting spring 47 thrusts against a stud 49 rigidly mounted in the chaser-operating ring 31 and projecting rearwardly into the groove 46 therein.

As thus arranged, the chaser-retracting spring 47 exerts a constant but yielding effort to turn the chaser-operating ring 31 in the direction of the arrow 50 shown in Fig. 6, to thus cause the cam-lugs 30 (Fig. 2) to move the chasers 28 outwardly into their retired position.

Rigidly installed in the rearwardly-opening annular groove 46 of the chaser-operating ring 31 is a segmental latch-block 51 which is held rigidly coupled to the said ring 31 by a pin 52, as indicated in Fig. 6. One end of the latch-block 51 has its rear corner beveled to provide an inclined latching-abutment 53 which is adapted to be engaged by a conical latching-nose 54 forwardly projecting from and forming part of a latching-stud 55. The latching-stud 55 is threaded through the inner end of a plate-like arm 56 forming a part of an L-shaped latch-member generally designated by the reference character 57. The said latch-member 57 also includes a forwardly-projecting cylindrical arm 58 extending in substantial parallelism with the axis of the die head and provided in its forward portion with a threaded bore 59 into which is threaded a tripping-screw 60 having a nut-like head 61 formed integral therewith and located forwardly of the front end of the arm 58.

The tripping-screw 60 is axially adjustable with respect to the forwardly-projecting cylindrical arm 58 of the latch-member 57, and for the purpose of firmly locking the said tripping-screw in any given position within its range of adjustment, the said tripping-screw has threaded onto it to the rear of the head 61, a lock-nut 62 which is adapted to be jammed against the forward face of the arm 58 of the latch-member 57 as is shown in Figs. 4 and 5.

Encircling the forward portion of the cylindrical-arm 58 of the L-shaped latch-member 57 is a tubular spring-plunger 63 which normally thrusts at its forward edge against the rear face of the lock-nut 62. The said tubular spring-plunger 63 is adapted to reciprocate together with the cylindrical-arm 58 of the latch-member 57, in a spring-pocket 64 having its axis extending parallel with the axis of the die head and formed in a forwardly-extending tubular-portion 65 of an L-shaped arm generally designated by the reference character 66, and formed integral with the latch-carrying member 32 before referred to.

Located in the rear portion of the spring-pocket 64 in the tubular-portion 65 of the arm 66, is a helical latching-spring 67. The said latching-spring 67 encircles the cylindrical-arm 58 of the latch-member 57, and thrusts at its forward end against the rear face of the tubular-plunger 63 and at its rear end the said spring thrusts against the rear wall of the spring-pocket 64. In this manner the latching-spring 67 exerts a constant but yielding effort to move the entire latch-member 57 forwardly in a direction required to interpose the latching-nose 54 of the latching-stud 55 into the path of movement of the latch-block 51 carried by the chaser-operating ring 31 as before described.

Leading rearwardly from the spring-pocket 64 in the tubular-portion 65 is a bearing-passage 68 extending through the rear face of the arm 66 and intersecting a radially-extending recess 69 formed in both the rear face of the said arm 66 as well as in the rear face of the latch-carrying member 32 proper. The said recess 69 normally accommodates the arm 56 of the latch-member 57. Leading forwardly from the inner end of the recess 69 just referred to, and in parallelism with the bearing-passage 68, is a clearance-passage 70 through which the forward portion of the latching-stud 55 projects, thus permitting the latching-nose 54 to be extended forwardly into the rearwardly-opening annular groove 46 in the chaser-operating ring 31, as is clearly shown in the drawings. To provide for the clearance of the outer end of the conical latching-nose 54, the bottom wall of the annular groove 46 has a clearance-recess 46a formed therein.

As shown particularly well in Figs. 3, 4 and 7, the latching-stud 55 is provided in its rear face with a polygonal wrench-receiving socket 71 by means of which the said latching-stud may be threaded forwardly and backwardly in a threaded passage 72 formed in the inner end of the arm 56 of the latch-member 57 and extending therethrough from the front face to the rear face thereof.

It will be apparent from the description just above given and from the accompanying drawings, that the latching-stud 55 may have its latching-nose 54 extended into the annular-groove 46 in the chaser-operating ring 31 any desired amount or until the radially-extending stop-flange 73 formed on the outer or rear end of the latching-stud 55 is seated against the rear face of the arm 56 of the latch-member 57, as appears particularly well in Figs. 4 and 5.

To hold the latching-stud 55 in any given position of adjustment, the latch-member 57 is provided with a threaded bore 74 perpendicular to and intersecting the threaded passage 72 formed in the inner end of the latch-member 57. Located in the lower portion of the threaded bore 74 is a resilient clamping-shoe 75 which bears against the threaded periphery of the latching-stud 55 and which, in turn, is engaged by a binding-screw 76 threaded in the upper portion of the threaded bore 74. It will thus be seen that the binding-screw 76 and clamping-shoe 75 securely retain the latching-stud 55 in any given position of adjustment with respect to the latch-member 57.

By backing off the binding-screw 76, the latching-stud 55 may be adjusted or completely removed from the latch-member and replaced by a similar latching-stud having its latching-nose formed with a different taper for cutting a taper-thread, in the manner as will hereinafter appear. It will thus be seen that any number of latching-studs having different tapers may be employed in place of the stud 55 shown in the drawings.

For the purpose of limiting the oscillating movement of the chaser-operating ring 31 and to provide for releasing such restraint, a radially-retirable limiting-plunger 77 is employed as is particularly well shown in Fig. 11. The said limiting-plunger 77 is provided with a relatively-slender stem 78 and is mounted for reciprocatory movement in a housing 79 partly threaded into the chaser-operating ring 31 and partly projecting from the outer periphery of the latter. The limiting-plunger 77 is yieldingly urged inwardly by a helical spring 80 which encircles its stem 78 and which is enclosed within the housing 79. The outer end of the stem 78 of the limiting-plunger 77 is provided with a peripherally-knurled finger-piece 81, by means of which the said limiting-plunger may be drawn radially outwardly against the tension of the spring 80. The inner end of the plunger 77 enters an arcuate limiting-recess 82 formed in the outer surface of the adjacent body-portion 25b of the chaser-carrying member 25. When the chaser-operating ring 31 is released to the action of the chaser-retracting spring 47 in a manner as will hereinafter appear, the limiting-plunger 77 will be brought into engagement with the end wall 83 of the limiting-recess 82 to thereby check the further turning movement of the said ring 31.

By grasping the finger-piece 81 of the limiting-plunger 77 and drawing outwardly upon the same so as to retire the said plunger from the limiting-recess 82, the chaser-operating ring 31 may be turned to a further degree to completely disengage the cam-lugs 30 from the respective notches 29 in the chasers 28, to thus permit the radial removal of the said chasers from the grooves 26 in the chaser-carrying member 25.

For the purposes of adjusting the cutting diameter of the chasers 28, the latch-carrying member 32 is provided with two adjusting-screws 84—84 respectively threaded into threaded bores 85—85 which latter intersect both the outer periphery and inner periphery of the latch-carrying member 32, as is particularly well shown in Fig. 7. The adjusting-screws 84—84 are adapted to respectively engage one of two adjusting-abutments 86—86 perpendicularly disposed with respect to the axis of the adjusting-screws 84—84 and respectively forming one face of a given one of two V-shaped notches 87—87 formed in the outer periphery of the body-portion 25b of the chaser-carrying member 25 upon which the latch-carrying member 32 is threadedly mounted.

It will be understood from the foregoing that by backing off one of the adjusting-screws 84 and advancing the complemental adjusting-screw or vice versa, the latch-carrying member 32 may be turned with respect to the chaser-carrying member 25 to thereby bodily move the latch-member 57 and hence the latching-stud 55 with respect to the chaser-carrying member 25. The shifting of the latching-stud 55 as just described, will result in the similar shifting of the chaser-operating ring 31, since the chaser-retracting spring 47 will normally maintain the latch-block 51 of the ring 31 in engagement with the latching-stud. The shifting of the chaser-operating ring 31 coincidentally with the adjustment of the latch-carrying member 32 will obviously also shift the cam-lugs 30 forming part of the chaser-operating ring 31, to thereby radially move the chasers 28 inwardly or outwardly to determine the mean-diameter of thread to be cut.

For the purpose of providing the necessary clearance for the latch-member 57 when the latter is in its retired position, the periphery of the flange 22 of the mounting-member 20 is formed with an arcuate clearance-notch 88 in that portion of the said flange which is immediately to the rear of the L-shaped arm 66, as is particularly well shown in Fig. 3.

With the parts positioned as is shown particularly well in Figs. 2, 4 and 6, the die head is ready for a threading operation since the chasers 28 are projected inwardly into their advanced or thread-cutting position and the latching-nose 54 of the latching-stud 55 by its engagement with the latch-block 51 of the chaser-operating ring 31, serves to rigidly but releasably hold the said chasers in the positions referred to.

With the shank 21 of the mounting-member 20 firmly clamped in the turret of a screw machine or other suitable holder, let it be assumed that the work A to be threaded is being rotated with respect to the die head structure which latter is held stationary save for the axial movement required to engage its chasers 28 with the work.

Let it now be assumed that the die head structure has reached a position in which its chasers 28 engage with the work A. Under these conditions, as the die head structure is fed toward the work, the head 61 of the tripping-screw 60 will, after a brief interval, engage with a tripping or actuating abutment such as the abutment 89 shown by broken lines in Figs. 4 and 5. When this engagement occurs, the forward travel of the said tripping-screw as well as the latch-member 57 and the parts carried thereby will be halted while the remainder of the die head structure continues to move axially forwardly onto the work.

As the die head structure continues its forward travel relative to the work and the now stationary latch-member 57 and parts carried thereby, the latching-abutment 53 of the latch-block 51 will slide forwardly with respect to the now-stationary latching-nose 54 of the latching-stud 55.

As the latch-block 51 with its latching-abutment 53 slides forwardly as described, it will, together with the chaser-operating ring 31, swing in a clockwise direction under the urge of the spring 47, as permitted by the taper of the latching-nose 54. It will be understood that the chaser-retracting spring 47 acts to turn the chaser-operating ring 31 in a clockwise direction to keep the latching-abutment 53 in constant engagement with the tapered surface of the conical latching-nose 54.

The described turning movement of the chaser-operating ring 31 will, through the intermediary of the cam-lugs 30 forming part thereof and the respective notches 29 in the chasers 28, progressively retire the said chasers as the die head structure moves forwardly relative to the stationary latch-member 57 and associated parts. This progressive retraction of the chasers 28 results in a tapered thread being cut upon the work, the taper desired for the thread being determined by the taper of the conical latching-nose 54.

When the die head structure has been moved sufficiently forwardly to move the latching-abutment 53 forwardly out of engagement with the latching-nose 54 (in which position the parts are shown in Figs. 5 and 9), the entire chaser-operating ring 31 and the parts carried thereby will be free of restraint, and the chaser-retracting spring 47 will instantly act to further turn the said chaser-operating ring in a clockwise direction until the limiting-plunger 77 engages with the end wall 83 of the limiting-recess 82 (Fig. 11).

By the movement above described, the cam-lugs 30 of the chaser-operating ring 31 will have been further and rapidly moved in a clockwise direction and will, by virtue of their coupling with the said chasers through the intermediary of the notches 29, effect the further retraction or retirement of the said chasers into their fully retired or work-clearing positions as indicated by broken lines in Fig. 2. The work just threaded and the die head may now be axially separated, and the die head reset preparatory to another threading operation.

The die head may be reset for another threading operation by turning the chaser-operating ring 31 in a counterclockwise direction against the tension of the chaser-retracting spring 47 by means of force applied to a resetting-lug 90 rigid with and radially projecting from the outer surface of the said chaser-operating ring 31.

As will be obvious from the foregoing, the tripping-point of the die head and the start of the cutting of the taper thread may be conveniently adjusted by varying the position of the tripping-screw 60 with respect to the latch-member 57. The length of taper thread cut may also be varied by advancing or retiring the latching-stud 55 with respect to the arm 56 of the latch-member 57.

By providing a latch-member 57 or its equivalent radially disposed with respect to the axis of the die head structure, the latching-stud 55 which controls the desired taper of the thread to be cut by the said die head is exposed and readily accessible for being removed and replaced by another similar latching-stud having a different taper upon its conical latching-nose or a latching-stud having a straight latching-nose for cutting straight threads. This ready accessibility of the latching-stud 55 permits the die head to be rapidly changed over for the cutting of any desired thread.

By a construction and arrangement of parts such as herein shown and described, not only is compactness and durability achieved, but extreme accuracy in cutting taper threads is assured.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member; a releasable latch-member carried by the said rotatably-shiftable latch-carrying member and having movement with respect thereto and with respect to the said chaser-operating member and also having a portion engageable with a portion of the latter to releasably hold the same in position to maintain the said chasers in their advanced positions; and adjusting-means for turning the said rotatably-shiftable latch-carrying member with respect to the said chaser-carrying member to similarly shift the said latch-member carried by the said latch-carrying member.

2. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member; a first latch-member carried by the said rotatably-shiftable latch-carrying member and having movement with respect thereto and with respect to the said chaser-operating member; a second latch-member carried by the said first latch-member with capacity for adjustment with respect thereto and engageable with a portion of the said chaser-operating member to releasably hold the same in their advanced positions; and adjusting-means for turning the said rotatably-shiftable latch-carrying member with respect to the said chaser-carrying member to similarly shift both the said first latch-member and the said second latch-member carried by the said latch-carrying member.

3. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member; a first latch-member carried by the said rotatably-shiftable latch-carrying member and having movement with respect thereto and with respect to the said chaser-operating member, a second latch-member threadedly engaged with the said first latch-member with capacity for axial adjustment with respect thereto and projecting forwardly into engagement with a portion of the said chaser-operating member to releasably hold the same in position to maintain the said chasers in their advanced positions; and adjusting-means for turning the said rotatably-shiftable latch-carrying member with respect to the said chaser-carrying member to similarly shift both the said first latch-member and the said second latch-member carried by the said latch-carrying member.

4. A self-opening die head including in combination: a chaser-carrying member; chasers movably mounted in the said chaser-carrying member; an oscillated chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member; a releasable latch-member carried by the said rotatably-shiftable latch-carrying member and having movement with respect thereto and with respect to the said chaser-operating member and also having a portion inclined with respect to the direction of movement of the latch-member and enageable with a portion of the chaser-operating member to releasably hold the same in position to maintain the said chasers in their advanced positions and constructed and arranged, when moved toward its releasing position, to permit the said chaser-operating member to gradually turn to progressively retire the said chasers; and adjusting-means for turning the said rotatably-shiftable latch-carrying member with respect to the said chaser-carrying member to similarly shift the said latch-member carried by the said latch-carrying member.

5. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member; a first latch-member carried by the said rotatably-shiftable latch-carrying member and having movement with respect thereto and with respect to the said chaser-operating member; a second latch-member attached to the said first latch-member with capacity for adjustment with respect thereto and having a conical terminal-portion engageable with a portion of the said chaser-operating member to releasably hold the latter in position to maintain the said chasers in their advanced positions, and constructed and arranged, when moved toward its releasing position, to permit the said chaser-operating member to gradually turn to progressively retire the said chasers; and adjusting-means for turning the said rotatably-shiftable latch-carrying member with respect to the said chaser-carrying member to similarly shift the said first and second latch-members carried by the said latch-carrying member.

6. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member and having a forwardly-extending tubular-portion projecting over the outer surface of the said chaser-operating member; a releasable latch-member carried by the said rotatably-shiftable latch-carrying member and having a forwardly-extending portion reciprocating in the forwardly-extending tubular-portion of the said latch-carrying member and also having an inwardly-extending portion engageable with a portion of the said chaser-operating member to releasably hold the same in position to maintain the said chasers in their advanced positions; and adjusting-means for turning the said rotatably-shiftable latch-carrying member with respect to the said chaser-carrying member to similarly shift the said latch-member carried by the said latch-carrying member.

7. A self-opening die head including in combination: a chaser-carrying member; chasers movably mounted in the said chaser-carrying member; an oscillating chaser-operating member mounted upon the said chaser-carrying member and operatively connected to the said chasers for controlling the movement thereof; spring-means urging the said chaser-operating member into position to retire the said chasers; a rotatably-shiftable latch-carrying member mounted upon the said chaser-carrying member to the rear of the said chaser-operating member and having a forwardly-extending tubular-portion projecting over the outer surface of the said chaser-operating member; an L-shaped latch-member carried by the said rotatably-shiftable latch-carrying member and having a forwardly-extending arm sliding in the tubular forwardly-extending portion of the said latch-carrying member, the said latch-member also having an arm extending radially inwardly and formed with a threaded aperture; a second latch-member threaded into the threaded aperture of the said L-shaped latch-member with capacity for axial adjustment with respect thereto and engaging a portion of the said chaser-operating member to releasably hold the same in position to maintain the said chasers in their advanced positions; and adjusting-means for turning the said rotatably-shiftable latch-carrying member with respect to the said chaser-carrying member to similarly shift both the said L-shaped latch-member and the said second latch-member carried by the said latch-carrying member.

ALBERT F. BREITENSTEIN.